United States Patent [19]

Tomita et al.

[11] Patent Number: 5,017,224
[45] Date of Patent: May 21, 1991

[54] WATER-RESISTANT INK COMPOSITION

[75] Inventors: Hajime Tomita; Yasuo Sonoda, both of Gunma, Japan

[73] Assignee: Kabushiki Kaisha Pilot, Tokyo, Japan

[21] Appl. No.: 541,763

[22] Filed: Jun. 21, 1990

[51] Int. Cl.$^5$ .............................................. C09D 11/02
[52] U.S. Cl. ......................................... 106/22; 106/20
[58] Field of Search ..................................... 106/20, 22

[56] References Cited

U.S. PATENT DOCUMENTS

| | | | |
|---|---|---|---|
| 4,155,768 | 3/1979 | Adams et al. | 106/22 |
| 4,197,135 | 4/1980 | Bailey et al. | 106/22 |
| 4,299,630 | 11/1981 | Hwang | 106/20 |
| 4,629,748 | 12/1986 | Miyajima et al. | 106/20 |
| 4,659,382 | 4/1987 | Kang | 106/22 |
| 4,666,519 | 5/1987 | Akiyama et al. | 106/20 |
| 4,789,400 | 12/1988 | Solodar et al. | 106/22 |

FOREIGN PATENT DOCUMENTS 1-152176 6/1989 Japan .

OTHER PUBLICATIONS

Chemical Abstracts 109: 151672r, Ariga et al., "Water--Thinned Jet Printing Inks Containing Polyallylalkylamines".
Chemical Abstracts 97: 129299m.
Chemical Abstracts 110: 175272g; Ariga et al., "Polyamine salts of sulfo- or carboxy-containing dyes".
Chemical Abstracts 97: 184143f.

Primary Examiner—Theodore Morris
Assistant Examiner—Mary C. DiNunzio
Attorney, Agent, or Firm—Beveridge, DeGrandi & Weilacher

[57] ABSTRACT

An aqueous ink composition is disclosed having high water resistance and excellent age stability and resistance to drying-up. A feature of the present invention resides in a water resistant ink composition comprising an aqueous vehicle which contains a polyamine containing primary amino groups in the proportion of 3-20% of amino groups contained in a molecule, one, two or more stabilizing agent selected from urea, thiourea, ethylene urea, hydroxyethyl urea, hydroxypropyl urea, ethylene, thiourea, diethyl thiourea, 2-pyrrolidone, polyvinyl pyrrolidone, sorbitol, dimethylsulfone and mixtures thereof and water and an anionic dye having a solubility of 10% by weight or more in said aqueous vehicle.

2 Claims, No Drawings

WATER-RESISTANT INK COMPOSITION

INTRODUCTION AND BACKGROUND

The present invention relates to an aqueous ink composition having high water resistance and excellent age stability and resistance to drying-up.

A variety of researches and developments with reference to aqueous ink compositions having water resistance have hitherto been conducted.

The so-called pigment type aqueous inks containing pigments as the main elements are well-known to the art. However, these pigment type aqueous inks are poor in dispersion stability and have the problem of sedimentation of pigment particles with time. When these inks are used in writing instruments, they tend to plug the ink passages of the instruments and thus inhibit the flow of smooth ink. In this type of ink the deposits of pigment particles along with the evaporation of water causes the so-called drying-up phenomenon at the writing tip of a pen. The result is a deposit of the pigment particles and plugging of the ink passages of the writing instrument.

Accordingly, the art has devised an aqueous ink composition having high water resistance, excellent age stability and resistance to drying-up.

Research on the so-called dye type aqueous ink composition containing dyes as main elements has been conducted in order to solve the problems known in the art. This has lead to an examination of the requisite conditions of ink such as the water resistance.

It has been found that in order to impart water resistance to the written matter produced by the ink, it is required for the written characters to bond to the paper tightly, and thus various materials were examined from the aspect of their adhesion to paper.

SUMMARY OF THE INVENTION

It has been found in accordance with the present invention that the combination of a polyamine having a molecular weight of 300 or more and an anionic dye greatly improves the water resistance of the written material on the paper.

The improvement as described above is probably due to the insolubilization of the polyamine by the reaction with paper and the cationic property of the polyamine leading to the reaction with the anionic dye to work as a binder between the paper and the dye.

In addition, the combination exhibits adhesiveness in an aqueous solution having a low viscosity and also affords water resistance to the dye.

However, if the polyamine has a primary amino group as the amino moiety, the primary amino group reacts strongly with the chromophors of the anionic dye thereby resulting in the discoloration of the dye and decreasing the solubility of the reaction product of the dye and the polyamine as well. This leads to sedimentation and lowering of the age stability.

However, it is essential for obtaining the water resistance as described above to add a polyamine to an ink composition.

According to the invention, if the amino moiety present in the polyamine is a secondary or tertiary amino group, its effect for obtaining water resistance is insufficient.

Therefore, it was determined in accordance with the present invention that a primary amino group must be introduced into a polyamine in order to improve the water resistance.

There have hitherto been produced inks containing polyamines having removed therefrom primary amino groups. However, such polyamines cannot naturally maintain the perfect resistance to water. If the perfect resistance to water is intended to be obtained with compositions free of primary amino groups, the amount of the polyamine added must be necessarily increased thus leading to an increase in the viscosity. The higher viscosity inhibits the smooth flow of ink. Such compositions can be employed only with difficulty in writing instruments and cannot be impressed satisfactorily into a writing surface such as paper or the like. As a result, the reaction with the writing surface takes place only at the interface thus leading to the inhibition of the water resistance of the writing on the paper.

The present invention features polyamines having removed therefrom the primary amino groups in order to improve the polyamine.

As a result, it has been determined that the use of a polyamine containing primary amino groups in a proportion of 3-20% to the total amino groups and having a molecular weight of 300 or more resulted in a great improvement of properties, particularly water resistance, by combining it with an anionic dye to produce a water resistant ink composition. These compositions have greatly improved water resistance and are excellent in resistance in drying-up, age stability and smooth ink flowability.

However, this ink tended with time to undergo a decrease in solubility of the reaction product of the anionic dye and the polyamine due to the primary amino groups contained in an amount of 3-20%, and the age stability of the ink was not satisfactory.

It has been found that if an aqueous composition comprising a polyamine containing the primary amino groups in an amount of 3-20% and having a molecular weight of 300 or more, an anionic dye and water has added thereto one, two or more stabilizing agents selected from urea, thiourea, ethylene urea, hydroxyethyl urea, hydroxypropyl urea, ethylene thiourea, diethyl thiourea, 2-prryolidone, polyvinyl pyrrolidone, sorbitol and dimethylsulfone, the undesired lowering of the solubility of the reaction product of the anionic dye and the polyamine is inhibited and the age stability is greatly improved.

This beneficial effect is probably due to the stabilizing agent which prevents the precipitation of the anionic dye which has bonded to the polyamine by further association.

In addition, the stabilizing agent had an excellent moisture retention, so that the resistance to drying-up is improved. The anionic dye used should have the solubility in a proportion of 10% by weight or more to the aqueous vehicle comprising the particular polyamine, the stabilizing agent and water. When using anionic dye having a solubility of less than 10% by weight, the solubility is too little and the age stability is not improved.

It has been found that the addition to an aqueous vehicle of one, two or more wetting agents selected from ethylene glycol, diethylene glycol, propylene glycol, glycerin, triethylene glycol, dipropylene glycol, thiodiglycol, polyglycerin, polyethylene glycol, polypropylene glycol, methyl cellosolve, ethyl cellosolve, butyl cellosolve, methyl carbitol, ethyl carbitol and butyl carbitol was further effective for preventing the precipitation.

DETAILED DESCRIPTION OF THE INVENTION

A feature of the present invention resides in a water resistant ink composition comprising an aqueous vehicle which contains a polyamine containing primary amino groups in the proportion of 3-20% of amino groups contained in a molecule, one, two or more stabilizing agent selected from urea, thiourea, ethylene urea, hydroxyethyl urea, hydroxypropyl urea, ethylene thiourea, diethyl thiourea, 2-pyrrolidone, polyvinyl pyrrolidone, sorbitol, dimethylsulfone and mixtures thereof and water and an anionic dye having a solubility of 10% by weight or more in said aqueous vehicle.

In a further aspect the water resistant ink composition according to the invention can contain at least one wetting agents selected from ethylene glycol, diethylene glycol, propylene glycol, glycerin, triethylene glycol, dispropylene glycol, thiodiglycol, polyglycerin, polyethylene glycol, polyproplylene glycol, methyl cellosolve, ethyl cellosolve, butyl cellosolve, methyl carbitol, ethyl carbitol and butyl carbitol.

The polyamine which contains the primary amino groups in proportion of 3-20% per molecule used in the present invention is preferably represented by the following structural formulae:

Examples of the polyamines which can be used in the present invention:

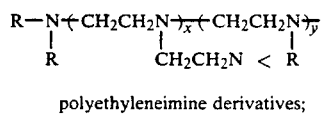

1. polyethyleneimine derivatives;

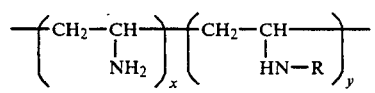

2. polyvinyl amine derivatives;

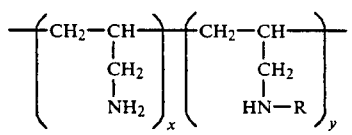

3. polyacrylamine derivatives wherein R represents H or $-(CH_2CH_2O)_n H$, $-(CH_2CH_2CH_2O)_n H$, or $CH_3$ or the like, x denotes a numeral in the range of 1-1,000, and y denotes a numeral in the range of 1-1,700.

In this connection, the primary groups are contained in a proportion of 3-20% of the total amines in a molecule, and the molecular weight is in the range of 300 or more. The polyamine containing the primary amino groups in a proportion of 3-20% of the total polyamine in a molecule is incorporated in an ink composition in an amount of 0.5-5% by weight.

As the polyamine of the present invention, there can be used other polyamines such as allylamine and the like in addition to those derived from polyethyleneimine, provided that the primary amino groups are contained in a proportion of 3% to 20% of the total amino groups per molecule in said polyamine.

The anionic dye used in the present invention is mainly selected from direct dyes or acid dyes, which are the ones having as hydrophilic groups anionic groups such as $-SO_3Na$, $-COONa$ or the like For example, the direct dyes are Direct Black 19, 154, Direct Blue 87 and the like; and the acid dyes are Acid Blue 1, 9, 90, 93 and Acid Red 18, 27, 87, 92 and 94, Acid Yellow 23 and 79, and Acid Orange 10 and the like.

The aqueous vehicle used in the present invention is prepared by incorporating water (deionized water) with a particular polyamine and the stabilizing agents.

The amount of the stabilizing agents are preferably in the range of 5-20% by weight, particularly about 10% by weight.

The amount of the wetting agent incorporated is preferably in the range of 10-30% by weight.

The present invention is illustrated specifically with reference to the following below.

EXAMPLE 1

A water resistant ink composition was prepared by uniforminly blending the following components:

| | |
|---|---|
| Direct Black 154 | 4.5% by weight |
| (solubility in vehicle, 20% or more) | |
| Polyamine | 3.0% by weight |
| (containing 3% of primary amino groups) | |
| Ethylene glycol | 20.0% by weight |
| Urea | 10.0% by weight |
| pH adjustor | 0.3% by weight |
| Surfactant (GAFAC, RS-410, TOHO Chem.) | 0.5% by weight |
| Anti-bacterial agent | 1.0% by weight |
| (Proxel XL-2, ICI)* | |
| Deionized water | 60.7% by weight |

*10% 1,2 -benzisothiazoline - 3-one in propylene glycol solution

EXAMPLES 2-34

Examples different from each other in the kinds and amounts of the polyamine, the stabilizing agent and the wetting agent that were blended and in the solubility of the dye are present in table 1.

COMPARATIVE EXAMPLE 1-14

The results of Comparative Examples using a polyamine outside the scope of the invention without a stabilizing agent and where the solubility of the anionic dye is in the range of 10% by weight or less are presented in Table 2.

In the table, polyamines A1-A5 are the following polyamines, respectively.

Content of primary amino group;

| | |
|---|---|
| A1 | 3% |
| A2 | 10% |
| A3 | 20% |
| A4 | 0% |
| A5 | 25% |

In Examples 1-22, 27-30, and in Comparative Examples 1-5, 11-14, triethanolamine was used. In Examples 23-26 and 31-34 and in Comparative Examples 6-10, sodium hydroxide was used.

As the surface active agents an anionic surfactant was used in both Examples and Comparative Examples.

Aqueous ink compositions of Examples and Comparative Examples were tested for their water resistance, age stability and resistance to drying up. The test results are presented in Table 1 and Table 2.

TABLE 1

| Example | 1 | 2 | 3 | 4 | 5 | 6 | 7 | 8 | 9 | 10 |
|---|---|---|---|---|---|---|---|---|---|---|
| Direct Black 154 (Solubility ≧ 20%) | 4.5 | 4.5 | 4.5 | 4.5 | 4.5 | 4.5 | 4.5 | 4.5 | 4.5 | 4.5 |
| Acid Red 94 (Solubility ≧ 30%) | | | | | | | | | | |
| Acid Blue 90 (Solubility ≧ 20%) | | | | | | | | | | |
| Polyamine A1 | 3.0 | | | | 3.0 | | | 3.0 | | |
| Polyamine A2 | | 3.0 | | | | 3.0 | | | 3.0 | |
| Polyamine A3 | | | 3.0 | 3.0 | | | 3.0 | | | 3.0 |
| Polyamine A4 | | | | | | | | | | |
| Polyamine A5 | | | | | | | | | | |
| Ethylene glycol | 20.0 | 20.0 | 20.0 | | | | | 10.0 | 10.0 | 10.0 |
| Diethylene glycol | | | | 20.0 | 20.0 | 20.0 | 20.0 | 10.0 | 10.0 | 10.0 |
| Glycerin | | | | | | | | | | |
| Urea | 10.0 | 10.0 | 10.0 | 10.0 | 10.0 | 10.0 | 10.0 | 10.0 | 10.0 | 10.0 |
| Ethylene urea | | | | | | | | | | |
| Hydroxyethyl urea | | | | | | | | | | |
| Sorbitol | | | | | | | | | | |
| Thiourea | | | | | | | | | | |
| pH adjuster | 0.3 | 0.3 | 0.3 | 0.3 | 0.3 | 0.3 | 0.3 | 0.3 | 0.3 | 0.3 |
| Surfactant | 0.5 | 0.5 | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 | 1.0 | 1.0 |
| Deionized water | Balance | Balance | Balance | Balance | Balance | Balance | Balance | Balance | Balance | Balance |
| Water resistance | ⊙ | ⊙ | ⊙ | ⊙ | ○ | ⊙ | ⊙ | ○ | ⊙ | ⊙ |
| Age stability | ⊙ | ⊙ | ○ | ○ | ⊙ | ⊙ | ○ | ⊙ | ⊙ | ○ |
| Resistance to drying-up | A | A | A | B | A | A | A | A | A | A |

| Example | 11 | 12 | 13 | 14 | 15 | 16 | 17 | 18 | 19 | 20 |
|---|---|---|---|---|---|---|---|---|---|---|
| Direct Black 154 (Solubility ≧ 20%) | 4.5 | 4.5 | 4.5 | 4.5 | 4.5 | 4.5 | 4.5 | 4.5 | 4.5 | 4.5 |
| Acid Red 94 (Solubility ≧ 30%) | | | | | | | | | | |
| Acid Blue 90 (Solubility ≧ 20%) | | | | | | | | | | |
| Polyamine A1 | 3.0 | | | 3.0 | | | 3.0 | | | 3.0 |
| Polyamine A2 | | 3.0 | | | 3.0 | | | 3.0 | | |
| Polyamine A3 | | | 3.0 | | | 3.0 | | | 3.0 | |
| Polyamine A4 | | | | | | | | | | |
| Polyamine A5 | | | | | | | | | | |
| Ethylene glycol | | | | 20.0 | 20.0 | 20.0 | 20.0 | 20.0 | 20.0 | 20.0 |
| Diethylene glycol | | | | | | | | | | |
| Glycerin | 20.0 | 20.0 | 20.0 | | | | | | | |
| Urea | 10.0 | 10.0 | 10.0 | | | | | | | |
| Ethylene urea | | | | 10.0 | 10.0 | 10.0 | | | | |
| Hydroxyethyl urea | | | | | | | 10.0 | 10.0 | 10.0 | |
| Sorbitol | | | | | | | | | | 10.0 |
| Thiourea | | | | | | | | | | |
| pH adjuster | 0.3 | 0.3 | 0.3 | 0.3 | 0.3 | 0.3 | 0.3 | 0.3 | 0.3 | 0.3 |
| Surfactant | 0.5 | 0.5 | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 | 1.0 | 1.0 |
| Deionized water | Balance | Balance | Balance | Balance | Balance | Balance | Balance | Balance | Balance | Balance |
| Water resistance | ○ | ⊙ | ⊙ | ○ | ⊙ | ⊙ | ○ | ⊙ | ⊙ | ○ |
| Age stability | ⊙ | ⊙ | ○ | ⊙ | ⊙ | ○ | ⊙ | ⊙ | ○ | ⊙ |
| Resistance to drying-up | A | A | A | A | A | A | A | A | A | A |

| Example | 21 | 22 | 23 | 24 | 25 | 26 | 27 | 28 | 29 | 30 |
|---|---|---|---|---|---|---|---|---|---|---|
| Direct Black 154 (Solubility ≧ 20%) | 4.5 | 4.5 | | | | | | | | |
| Acid Red 94 (Solubility ≧ 30%) | | | | | | | | | | |
| Acid Blue 90 (Solubility ≧ 20%) | | | 3.0 | 3.0 | 3.0 | 3.0 | 3.0 | 3.0 | 3.0 | 3.0 |
| Polyamine A1 | | | 2.0 | | | 2.0 | 2.0 | | | |
| Polyamine A2 | 3.0 | | | 2.0 | | | | 2.0 | | |
| Polyamine A3 | | 3.0 | | | 2.0 | | | | 2.0 | 2.0 |
| Polyamine A4 | | | | | | | | | | |
| Polyamine A5 | | | | | | | | | | |
| Ethylene glycol | 20.0 | 20.0 | 10.0 | 10.0 | 10.0 | | 30.0 | 30.0 | 30.0 | |
| Diethylene glycol | | | | | | | | | | |
| Glycerin | | | | | | | | | | |
| Urea | | | 5.0 | 5.0 | 5.0 | 5.0 | 10.0 | 10.0 | 10.0 | 10.0 |
| Ethylene urea | | | | | | | | | | |
| Hydroxyethyl urea | | | | | | | | | | |
| Sorbitol | 10.0 | 10.0 | | | | | | | | |
| Thiourea | | | 5.0 | 5.0 | 5.0 | 5.0 | | | | |
| pH adjuster | 0.3 | 0.3 | 0.1 | 0.1 | 0.1 | 0.1 | 0.3 | 0.3 | 0.3 | 0.3 |

TABLE 1-continued

| | | | | | | | | | | |
|---|---|---|---|---|---|---|---|---|---|---|
| Surfactant | 0.5 | 0.5 | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 | 1.0 | 1.0 |
| Deionized water | Balance | Balance | Balance | Balance | Balance | Balance | Balance | Balance | Balance | Balance |
| Water resistance | ◎ | ◎ | ◎ | ◎ | ◎ | ◎ | ◎ | ◎ | ◎ | ◎ |
| Age stability | ◎ | ○ | ◎ | ◎ | ◎ | ○ | ◎ | ◎ | ◎ | ○ |
| Resistance to drying-up | A | A | A | A | A | B | A | A | A | B |

| Example | 31 | 32 | 33 | 34 |
|---|---|---|---|---|
| Direct Black 154 (Solubility ≧ 20%) | | | | |
| Acid Red 94 (Solubility ≧ 30%) | 3.0 | 3.0 | 3.0 | 3.0 |
| Acid Blue 90 (Solubility ≧ 20%) | | | | |
| Polyamine A1 | 2.0 | | | |
| Polyamine A2 | | 2.0 | | |
| Polyamine A3 | | | 2.0 | 2.0 |
| Polyamine A4 | | | | |
| Polyamine A5 | | | | |
| Ethylene glycol | 10.0 | 10.0 | 10.0 | |
| Diethylene glycol | | | | |
| Glycerin | | | | |
| Urea | 10.0 | 10.0 | 10.0 | 10.0 |
| Ethylene urea | | | | |
| Hydroxyethyl urea | | | | |
| Sorbitol | | | | |
| Thiourea | | | | |
| pH adjuster | 0.1 | 0.1 | 0.1 | 0.1 |
| Surfactant | 0.5 | 0.5 | 0.5 | 0.5 |
| Antibacterial agent | 1.0 | 1.0 | 1.0 | 1.0 |
| Deionized water | Balance | Balance | Balance | Balance |
| Water resistance | ○ | ◎ | ◎ | ◎ |
| Age stability | ◎ | ◎ | ◎ | ○ |
| Resistance to drying-up | A | A | A | B |

TABLE 2

| Comparative Example | 1 | 2 | 3 | 4 | 5 | 6 | 7 | 8 |
|---|---|---|---|---|---|---|---|---|
| Direct Black 154 (Solubility ≧ 20%) | 4.5 | 4.5 | 4.5 | 4.5 | | | | |
| Acid Black 2 (Solubility < 10%) | | | | | 4.5 | | | |
| Acid Red 94 (Solubility ≧ 30%) | | | | | | 3.0 | 3.0 | 3.0 |
| Acid Red 73 (Solubility < 5%) | | | | | | | | |
| Acid Blue 90 (Solubility ≧ 20%) | | | | | | | | |
| Acid Blue 15 (Solubility < 10%) | | | | | | | | |
| Polyamine A1 | | | | | 3.0 | | | |
| Polyamine A2 | | | | | | | | |
| Polyamine A3 | | | | 3.0 | | | | |
| Polyamine A4 | 3.0 | 10.0 | | | | 2.0 | 12.0 | |
| Polyamine A5 | | | 3.0 | | | | | 2.0 |
| Ethylene glycol | 20.0 | 20.0 | 20.0 | 20.0 | 20.0 | 10.0 | 10.0 | 10.0 |
| Diethylene glycol | | | | | | | | |
| Glycerin | | | | | | | | |
| Urea | 10.0 | 10.0 | 10.0 | | 10.0 | 10.0 | 10.0 | 10.0 |
| pH adjuster | 0.3 | 0.3 | 0.3 | 0.3 | 0.3 | 0.1 | 0.1 | 0.1 |
| Surfactant | 0.5 | 0.5 | 0.5 | 0.5 | 0.5 | 0.5 | 0.5 | 0.5 |
| Antibacterial agent | 1.0 | 1.0 | 1.0 | 1.0 | 1.0 | 1.0 | 1.0 | 1.0 |
| Deionized water | Balance | Balance | Balance | Balance | Balance | Balance | Balance | Balance |
| Water resistance | X | X | ◎ | ◎ | ◎ | X | X | ◎ |
| Age stability | ◎ | ○ | X | X | X | ◎ | ○ | X |
| Resistance to drying-up | A | B | D | D | D | B | C | D |

| Comparative Example | 9 | 10 | 11 | 12 | 13 | 14 |
|---|---|---|---|---|---|---|
| Direct Black 154 (Solubility ≧ 20%) | | | | | | |
| Acid Black 2 (Solubility < 10%) | | | | | | |
| Acid Red 94 (Solubility ≧ 30%) | 3.0 | | | | | |
| Acid Red 73 (Solubility < 5%) | | 3.0 | | | | |
| Acid Blue 90 (Solubility ≧ 20%) | | | 3.0 | 3.0 | 3.0 | |

TABLE 2-continued

| | | | | | | |
|---|---|---|---|---|---|---|
| Acid Blue 15 (Solubility < 10%) | | | | | | 3.0 |
| Polyamine A1 | | 2.0 | | | | 2.0 |
| Polyamine A2 | | | | | | |
| Polyamine A3 | 2.0 | | | | 2.0 | |
| Polyamine A4 | | | 2.0 | | | |
| Polyamine A5 | | | | 2.0 | | |
| Ethylene glycol | 10.0 | 10.0 | 30.0 | 30.0 | 30.0 | 30.0 |
| Diethylene glycol | | | | | | |
| Glycerin | | | | | | |
| Urea | | 10.0 | 10.0 | 10.0 | | 10.0 |
| pH adjuster | 0.1 | 0.1 | 0.3 | 0.3 | 0.3 | 0.3 |
| Surfactant | 0.5 | 0.5 | 0.5 | 0.5 | 0.5 | 0.5 |
| Antibacterial agent | 1.0 | 1.0 | 1.0 | 1.0 | 1.0 | 1.0 |
| Deionized water | Balance | Balance | Balance | Balance | Balance | Balance |
| Water resistance | ◎ | ◎ | X | ◎ | ◎ | ◎ |
| Age stability | X | X | ◎ | X | X | X |
| Resistance to drying-up | D | D | A | D | D | D |

(Note to Tables 1 and 2)
Water resistance: Blotting of ink and stain on a writing surface such as writing paper by dipping the surface immediately after writing on it,
◎: none; ◯: a little; X: present
Age stability: Abnormalities such as precipitation, thickening after permitting the writing to stand in a glass containing at 50° C. for 2 months,
◎: none; ◯: a little; X: present
Resistance to drying-up: Period until abnormality occurs in the written material on leaving the pen to stand with the cap of the pen being removed under the conditions at 40° C., 50% RH,
A: 2 months or more; B: 1 month or more; C: 7 days or more; D: less than 7 days.

The present invention, as apparent from the comparison tests described above, provides an excellent ink composition by which its particular construction having solved the problems of water resistance, age stability and resistance to trying-up which have not hitherto been solved. The water resistant ink composition of the present invention is particularly suitable for water ball point pens or felt tipped pens and exhibits excellent effects.

We claim:

1. A water resistant ink composition comprising an aqueous vehicle which contains a polyamine containing primary amino groups in proportion of 3–20% of amino groups contained in a molecule, a stabilizing agent selected from urea, thiourea, ethylene urea, hydroxyethyl urea, hydroxyproplyl urea, ethylene thiourea, diothylthiourea, 2-pyrrolidone, polyvinyl pyrrolidone, soribitol, dimethylsulfone, and mixtures therefore and water, and an amionic dye having a solubility of 10% by weight or more in said aqueous vehicle.

2. A water resistant ink composition according to claim 1, wherein the composition contains a wetting agent selected from ethylene glycol, diethylene glycol, propylene glycol, glycerin, triethylene glycol, dipropylyene glycol, thiodiglycol, polyglycerin, polyethylene glycol, polyproplene glycol, methyl cellosolve, ethyl cellosolve, butyl cellosolve, methyl carbitol, ethyl carbitol, butyl carbitol and mixtures thereof.

* * * * *